Nov. 25, 1969  YUKIO TANAKA ET AL  3,480,486
HEATING METHOD FOR LOCAL ANNEALING OR STRESS RELIEVING
OF PARTS OF METAL ARTICLES
Filed June 2, 1966

United States Patent Office 3,480,486
Patented Nov. 25, 1969

3,480,486
HEATING METHOD FOR LOCAL ANNEALING OR STRESS RELIEVING OF PARTS OF METAL ARTICLES
Yukio Tanaka, Katsuji Soya, and Hitoshi Yamagishi, Tokyo-to, Japan, assignors to Kokusai Denki Kabushiki Kaisha (known as Kokusai Electric Co., Ltd.), Tokyo-to, Japan, a joint-stock company of Japan
Filed June 2, 1966, Ser. No. 554,706
Claims priority, application Japan, June 18, 1965, 40/35,982, 40/35,983; Aug. 20, 1965, 40/50,396
Int. Cl. C21d *1/68, 1/30*
U.S. Cl. 148—18                                4 Claims

ABSTRACT OF THE DISCLOSURE

Metal parts are annealed efficiently by first coating the part to be annealed with an absorbent of radiant energy which is principally ferric oxide and then heating the part.

---

Figure 1:
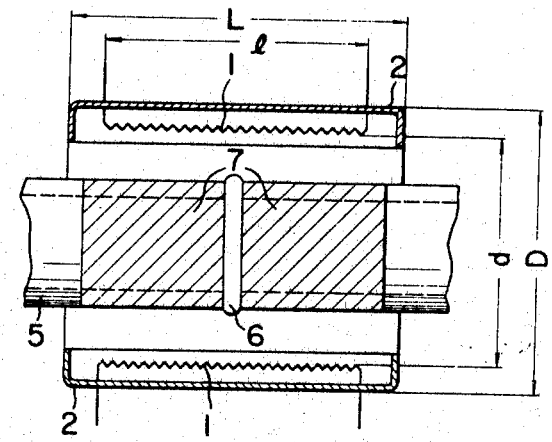

This invention relates to techniques in heating metal articles, particularly steel articles, for local annealing or stress relieving of the weld portion thereof. More particularly, the invention relates to a new method for locally heating metal articles such as steel tubes, plates, and plate structures whereby local annealing or stress relieving of the weld portion thereof can be accomplished with high heating efficiency.

In general, in order to heat locally one part of a large metal structure to a high temperature by radiant heating, it is necessary to impart radiant energy of high density in a concentrated manner to the part to be heated.

For example, certain steel pipes of high tensile strength are made by butt welding two or more lengths of the pipes, and it is often necessary after welding to stress relieve the pipes over a certain distance (of the order of approximately 150 mm.) on each side (left and right) of the weld line. For this purpose, a common known practice is to employ low-frequency induction heating or to heat a pipe to be annealed by wrapping an asbestos sheet around the pipe, further wrapping therearound a high-resistance electrical heating element such as so-called nichrome wire passed through an insulator tube, and passing a current through the nichrome wire, that is, by thermal conduction. By the latter method utilizing thermal conduction, however, heating of the pipe by radiation cannot be expected, and this method has not yet been reduced fully to practice in spite of various attempts.

It is an object of the present invention to provide a practical and efficient local heating method for annealing or stress relieving of local parts of metal articles through radiant heating.

Another object of the invention is to provide a method as stated above which can be readily practiced with the use of relatively simple apparatus.

The principal feature of the local heating method according to the present invention resides in the application of a coating of a radiation absorbing medium or radiation absorbent on the part to be heated or on both the part to be heated and the heat radiator or emitter, in order to increase the efficiency of transfer of radiant energy therebetween, thereby to fulfil the aforementioned requirement of imparting high-density radiant energy in a concentrated manner to the part to be heated.

According to the present invention, briefly stated, there is provided a method for locally heating metal articles such as steel tubes, plates, and plate structures for annealing or stress relieving of local parts thereof, characterized by the procedure of applying a radiation absorbent containing ferric oxide ($Fe_2O_3$) as its principal agent onto a part to be heated and irradiating the part thus coated with radiant rays thereby to heat and anneal or stress relieve the part.

In a modification of the method of the invention, the part to be heated is coated with a first radiation absorbent containing ferric oxide as its principal agent and is then heated by irradiation by an emitter coated with the same first radiation absorbent or with a second radiation absorbent having radiation absorption characteristics similar to those of the first radiation absorbent.

It has been found that the application of the radiation absorbent as described above is highly effective in facilitating local heating for annealing, particularly for stress relieving, in the field, of large steel structures such as, for example, large tanks and nuclear reactor structures made of high tensile strength steels, the local heating of which has heretofore been difficult.

The nature, principle, and details of the invention, as well as its utility, will be more clearly apparent from the following detailed description with respect to a preferred embodiment of the invention, when read in conjunction with the accompanying drawing, in which like parts are designated by like reference numerals.

Figure 2:
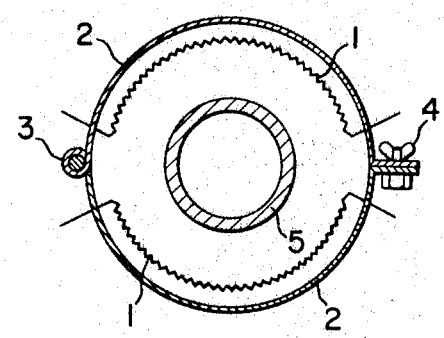

In the drawing:

FIGURE 1 is a side view, partly in section, illustrating one example of embodiment of the invention as applied to the heating of a steel pipe; and FIGURE 2 is a cross sectional view of the heating device and steel pipe shown in FIGURE 1.

Referring to FIGURES 1 and 2, a steel pipe 5 having a transverse butt weld 6 is to be heated locally at its part 7 in the vicinity of the weld 6. According to the principal feature of the present invention, this part 7 is coated with a radiation absorbent which consists essentially of ferric oxide ($Fe_2O_3$) dispersed in water glass.

The steel pipe 5 is centrally supported within a radiation heating device comprising electric heater wires 1 in suitable arrangement, and a cylindrical structure 2 for supporting the electric ribbon heater element 1. The cylindrical structure 2 is of longitudinally split construction and, being hinged at 3, can be readily positioned around an article such as pipe 5 to be heated, thereupon being held in closed state by at least one screw and wing nut combination 4.

By passing electric current through the heater element 1 to heat the local part 7 coated with the radiation absorbent as described above, it is possible to carry out heating and annealing in an efficient manner since the radiation rays are efficiently absorbed into the part 7 to be annealed.

More specifically, it is necessary, in general, for annealing one local part of a long pipe in actual practice, to heat that part so that its temperature rises linearly at a rate of from 50 to 150 degrees C. per hour. Therefore, when conduction heat loss is considered, the generated heat energy for the local part must be at least 7 watts/cm.² or more.

This requirement is satisfied, however, by coating the part to be annealed with a radiation absorbent consisting essentially of $Fe_2O_3$ powder dispersed in water glass according to the invention, and it is possible to cause the temperature of that part to reach the required temperature value (for example, 730 degrees C.).

The term "required temperature" is herein used to designate a temperature exceeding the Curie point of the material being heated and varies with the nature of the material being heated, being in the approximate range of from 600 to 1,000 degrees C. The above mentioned 730 degrees C. is merely one example thereof.

In an actual instance of practice, for annealing a transverse butt welded joint of a steel pipe of 1-inch wall thickness and 6-inch inner diameter, a heating device as described hereinafter having a heat emitter disposed concentrically around the steel pipe and having an inner diameter D of 230 mm., an emitter length $l$ of 400 mm., an outer diameter D of 330 mm., and a total length L of 450 mm. as indicated in FIGURE 1 was used with a power input of 23 kw., whereupon the annealing was successfully accomplished with a temperature rise rate of 150 degrees per hour. The temperature of the emitter during this process was 800 degrees C.

In contrast, when the part to be heated was not coated with $Fe_2O_3$, the temperature rise rate under the same process conditions was very low, and the temperature attained did not exceed 530 degrees C. Thus, it is clearly apparent that the application of the radiation absorbent according to the invention has a remarkable effect in increasing the absorption of radiation by the part being locally heated.

It has been found that a satisfactory coating of radiation absorbent can be formed by dispersing $Fe_2O_3$ powder in two to three times its weight of water glass to prepare a fluid absorbent of the consistency of paint, applying this fluid absorbent with a brush onto a part to be heated, and permitting the applied coating to dry naturally for approximately two hours, after which the heating process can be immediately started.

In the above described actual instance of heating, the heating device was provided with a heating element or emitter consisting of a number of electric resistance heater ribbons, each of 32-mm. width and 400-mm. length, in semi-circular arrangement with spaces of 3 mm. between adjacent ribbons. These heater ribbons were divided into two groups which were assembled face-to-face (i.e., with their concave sides facing each other) to form a cylindrical emitter surrounding the pipe to be heated.

A split type heating device of the above description is highly suitable and convenient for annealing and stress relieving work in the field. It has been found that, by means of an emitter of the above described character, it is possible to carry out stress relieving of steel pipes of from 4-inch inner diameter (nominal diameter) and 1-inch wall thickness to 8-inch outer diameter and 2-inch wall thickness.

While the above description relates to the case where the article heated is a tubular structure, the method of the invention exhibits pronounced effectiveness when applied to the heating for annealing of local parts of very wide steel plates as, for example, in ship hull, which heating for annealing was heretofore considered to be infeasible.

In one example of such heating in practice, a heating element consisting of 13 electric resistance heater ribbons, each of 32-mm. width, 0.8-mm. thickness, and 400-mm. length, in parallel and planar arrangement with spacing of 3 mm. between adjacent ribbons was used to heat a local part at a central part of a steel plate of 1-metre width, 2-metre length, and 6-mm. thickness, a gap of 30 mm. being set between the heating element and the steel plate.

As a result, it was possible to heat an area of 300 mm. x 300 mm. of the steel plate confronting the heating element to a temperature of 630 degrees C. with surface temperature of the heating element of approximately 980 degrees C. The heating time of this process was one hour, and the input power was 40 kw.

It was found that, when the coating of radiation absorbent was not used, the temperature of the local part of the steel plate could not be raised above 300 degrees C. under the same process conditions except for the coating.

It was found further in connection with the above example of practice that, when a radiation absorbent containing $Fe_2O_3$ powder was applied as a coating onto the surface of the heating element (i.e., the emitter), the surface temperature of the emitter was lowered to approximately 900 degrees C. with the same power input (40 kw.), and the heating time for the same process, moreover, was shortened to 40 minutes.

This result means that the emissivity of the emitter was increased by the application of the absorbent and, at the same time, indicates that the heating effectiveness was increased substantially by the state wherein the surface of the emitter and the surface of the article being heated had the same radiation wave length distribution characteristic. As a resultant effect in such cases, the difference between the ultimate heating temperature of the part being heated and the temperature of the emitter is decreased, and, as an attendant result, the heating effectiveness is increased, and the life of the emitter is prolonged.

What we claim is:

1. A heating method for local annealing of parts of annealable metal articles which comprises coating each of said parts with an absorbent for radiant heat in fluid form consisting essentially of a brushable dispersion of ferric oxide in water glass and then heating said part thus coated thereby annealing said part.

2. A method according to claim 1 in which said coated part is heated by means of a heating element which has been coated with said absorbent for radiant heat.

3. A method for annealing parts of steel articles which comprises coating each of said parts with an absorbent for radiant heat in fluid form consisting essentially of one part by weight of ferric oxide powder dispersed in about two to three parts by weight of water glass and then heating said part thus coated, thereby annealing said part.

4. A method for annealing parts of steel articles which comprises coating each of said parts with an absorbent for radiant heat in fluid form which consists essentially of one part by weight of ferric oxide powder dispersed in about two to three parts by weight of water glass and then heating said part thus coated by means of a heating element which has been coated with said absorbent for radiant heat.

References Cited

UNITED STATES PATENTS

| 1,634,586 | 7/1927 | Kubo | 148—14 |
| 3,314,827 | 4/1967 | Vries | 148—13.1 |

RICHARD O. DEAN, Primary Examiner

U.S. Cl. X.R.

148—20.6, 27, 28, 13.1, 14